US008075393B2

(12) United States Patent
Seelig et al.

(10) Patent No.: US 8,075,393 B2
(45) Date of Patent: Dec. 13, 2011

(54) GAMING DEVICE DISPLAY AND METHODS OF USE

(75) Inventors: Jerald C. Seelig, Absecon, NJ (US); Lawrence M. Henshaw, Hammonton, NJ (US)

(73) Assignee: Atlantic City Coin & Slot Service Company, Inc., Pleasantville, NJ (US)

( * ) Notice: Subject to any disclaimer, the term of this patent is extended or adjusted under 35 U.S.C. 154(b) by 860 days.

(21) Appl. No.: 12/120,435

(22) Filed: May 14, 2008

(65) Prior Publication Data

US 2008/0248860 A1 Oct. 9, 2008

Related U.S. Application Data

(60) Division of application No. 10/810,175, filed on Mar. 26, 2004, now abandoned, which is a continuation-in-part of application No. 10/309,736, filed on Dec. 3, 2002, now abandoned, and a continuation-in-part of application No. 10/245,623, filed on Sep. 16, 2002, which is a continuation-in-part of application No. 09/967,055, filed on Sep. 28, 2001, now Pat. No. 6,814,665, said application No. 10/810,175 is a continuation-in-part of application No. 10/622,805, filed on Jul. 18, 2003, now Pat. No. 7,169,043, which is a continuation-in-part of application No. 09/927,245, filed on Aug. 10, 2001, now Pat. No. 6,609,972.

(60) Provisional application No. 60/458,762, filed on Mar. 28, 2003, provisional application No. 60/502,427, filed on Sep. 12, 2003, provisional application No. 60/241,384, filed on Oct. 17, 2000, provisional application No. 60/241,385, filed on Oct. 17, 2000.

(51) Int. Cl.
*A63F 13/00* (2006.01)

(52) U.S. Cl. ................................ 463/20; 463/16; 463/17

(58) Field of Classification Search .................... 463/16, 463/17, 20
See application file for complete search history.

(56) References Cited

U.S. PATENT DOCUMENTS

| | | | | |
|---|---|---|---|---|
| 4,448,419 | A | 5/1984 | Telnaes | |
| 5,456,465 | A | 10/1995 | Durham | |
| 5,823,874 | A | 10/1998 | Adams | |
| 5,848,932 | A | 12/1998 | Adams | |
| 6,336,863 | B1 | 1/2002 | Baerlocher et al. | |
| 6,569,015 | B1 * | 5/2003 | Baerlocher et al. | 463/16 |

OTHER PUBLICATIONS

Fey, Marshall. Slot Machines, A Pictorial History of the First 100 Years. 5th Ed. Silver Cup Machine on p. 70. 3 pages. Liberty Bell Books. 1997.*

* cited by examiner

*Primary Examiner* — James McClellan
(74) *Attorney, Agent, or Firm* — Ian F. Burns & Associates, P.C.

(57) ABSTRACT

In at least one embodiment, the present invention is directed to a gaming apparatus. The gaming apparatus may include a housing defining a display area on which at least one indicium representing at least one prize is displayed. The gaming device also may include a plurality of display characters. At least one of the display characters is configured to move and indicate at least one indicium. The gaming apparatus further includes a controller in communication with at least one of the plurality of display characters and configured to direct the movement of the display character. The controller is also configured to generate a random number and generate a game outcome based on the random number. The controller is configured to move at least one display character to indicate at least one indicium that corresponds to the game outcome.

15 Claims, 12 Drawing Sheets

GAMING DEVICE DISPLAY AND METHODS OF USE

CROSS REFERENCES TO RELATED PATENT APPLICATIONS

This application is a divisional application of U.S. patent application Ser. No. 10/810,175, filed Mar. 26, 2004, which is a continuation in part application of U.S. patent application Ser. No. 10/309,736, filed Dec. 3, 2002. The 10/810,175 application also claims priority to provisional U.S. application having Ser. No. 60/458,762, filed Mar. 28, 2003 and provisional U.S. application having Ser. No. 60/502,427 filed Sep. 12, 2003. The 10/810,175 application is also a continuation in part of U.S. patent application Ser. No. 10/245,623, filed Sep. 16, 2002, which is a continuation in part of U.S. patent application Ser. No. 09/967,055, filed Sep. 28, 2001, now U.S. Pat. No. 6,814,665, which also claims priority of U.S. Provisional Application Ser. No. 60/241,384, filed Oct. 17, 2000. The 10/810,175 application is also a continuation in part of U.S. application Ser. No. 10/622,805, filed Jul. 18, 2003, now U.S. Pat. No. 7,169,043, which is a continuation in part of U.S. application Ser. No. 09/927,245, now U.S. Pat. No. 6,609,972, filed Aug. 10, 2001, which claims priority of U.S. Provisional Application Ser. No. 60/241,385, filed Oct. 17, 2000. Each of the aforementioned applications is hereby expressly incorporated by reference into the present application in its entirety.

FIELD OF THE INVENTION

The present invention relates to gaming devices and, more particularly, to gaming devices having at least one moveable display character that displays a prize to a player.

BACKGROUND

Gaming devices are well known in the art and a large variety of gaming devices have been developed. In general, gaming devices allow users, or players, to play a game. In many casino-type gaming devices, the outcome of the game depends, at least in part, on a randomly generated event. For example, a gaming device may use a random number generator to generate a random or pseudo-random number (hereinafter collectively referred to as "random number"). The random number may be used to determine a game outcome. For example, the random number can be compared to a predefined table to determine a corresponding outcome of the event. If the random number falls within a certain range of numbers on the table, the player may win the corresponding prize. The table may also contain display information that allows the gaming device to generate a display that corresponds to the outcome of the game. The gaming device may present the outcome of the game on a large variety of display devices, such as mechanical spinning reels, spinning wheels, or video screens.

Some gaming devices award bonus prizes in addition to prizes that are awarded in a primary game. A bonus prize is generally defined as a prize in addition to the prize obtained from the primary game and is awarded to the player when a pre-defined event occurs. An example of a bonus game can be found in U.S. Pat. No. 5,848,932 to Adams. Adams discloses a primary game having three spinning game reels and a bonus game having a bonus display with one spinning wheel. The spinning wheel is divided into multiple sections, and each section has a symbol representing a prize. When pre-determined indicia are displayed on the spinning game reels of the primary game, the wheel of the bonus display spins and stops. The bonus prize is displayed as the symbol on the wheel being pointed to by a pointer. The bonus prize is awarded in addition to any prizes awarded in the primary game.

Another bonus game is disclosed in Baerlocher et al. (U.S. Pat. No. 6,336,863). Baerlocher et al. discloses a slot machine with a bonus award display. The bonus award display has a bonus wheel and a mechanical, movable pointer.

One of the problems associated with the devices disclosed in these references is that the outcome of the bonus game is communicated to the player almost immediately. When a bonus game is triggered, a bonus award is selected, displayed, and awarded to the player. The player can see what the outcome of the game is immediately after the pointers have stopped moving. What has long been needed is a device that utilizes intermediate steps between the occurrence of the bonus event and the awarding of the bonus prize to add an additional element of anticipation and excitement for the players. It is further desired that the intermediate steps involve an eye-catching display and player participation. Another problem associated with Adams and Baerlocher et al. is that they utilize a plain combination of wheel and pointer. The Applicants have discovered that more can be done to existing display devices to make them more attractive and interesting to play.

SUMMARY OF AT LEAST ONE EMBODIMENT OF THE INVENTION

Advantages of One or More Embodiments of the Present Invention

The various embodiments of the present invention may, but do not necessarily, achieve one or more of the following advantages:

provide a highly attractive and entertaining device for conducting games;

provide a highly attractive and entertaining device for displaying prizes;

the ability to attract more patrons to play a game;

the ability to encourage players to play longer on a gaming apparatus;

provide at least one attractive prize display;

utilize intermediate steps between the occurrence of the bonus event and the awarding of the bonus prize;

provide intermediate steps between the occurrence of the bonus event and the awarding of the bonus prize that involve player participation;

provide intermediate steps between the occurrence of the bonus event and the awarding of the bonus prize that involve an eye-catching display;

provide an additional element of anticipation and excitement for players provide one or more moveable display characters;

provide one or more moveable display characters whose movement may be choreographed;

provide one or more movable display characters which may be used to indicate one or more indicium; and provide one or more movable display characters which may be used to indicate one or more indicium appearing on a changeable display area.

These and other advantages may be realized by reference to the remaining portions of the specification, claims, and abstract.

Brief Description of at Least One Embodiment of the Present Invention

In at least one embodiment, the present invention is directed to a gaming apparatus. The gaming apparatus may include a housing defining a display area on which at least one indicium representing at least one prize is displayed. The gaming device also may include a plurality of display characters. At least one of the display characters is configured to move and indicate at least one indicium. The gaming apparatus further includes a controller in communication with at least one of the plurality of display characters and configured to direct the movement of the display character. The controller is also configured to generate a random number and generate a game outcome based on the random number. The controller is configured to move at least one display character to indicate at least one indicium that corresponds to the game outcome.

In other embodiments, the present invention is directed to a gaming method. A player is allowed to place a wager on a gaming device having a plurality of moveable display characters and at least one indicium. A game is presented to the player and a game outcome is determined. At least a first display character is moved. At least a first indicium indicating the game outcome is displayed and at least the first display character is positioned to indicate at least the first indicia.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Certain embodiments of the present invention are shown in the accompanying drawings wherein.

DESCRIPTION OF CERTAIN EMBODIMENTS OF THE PRESENT INVENTION

In the following detailed description of certain embodiments of the invention, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
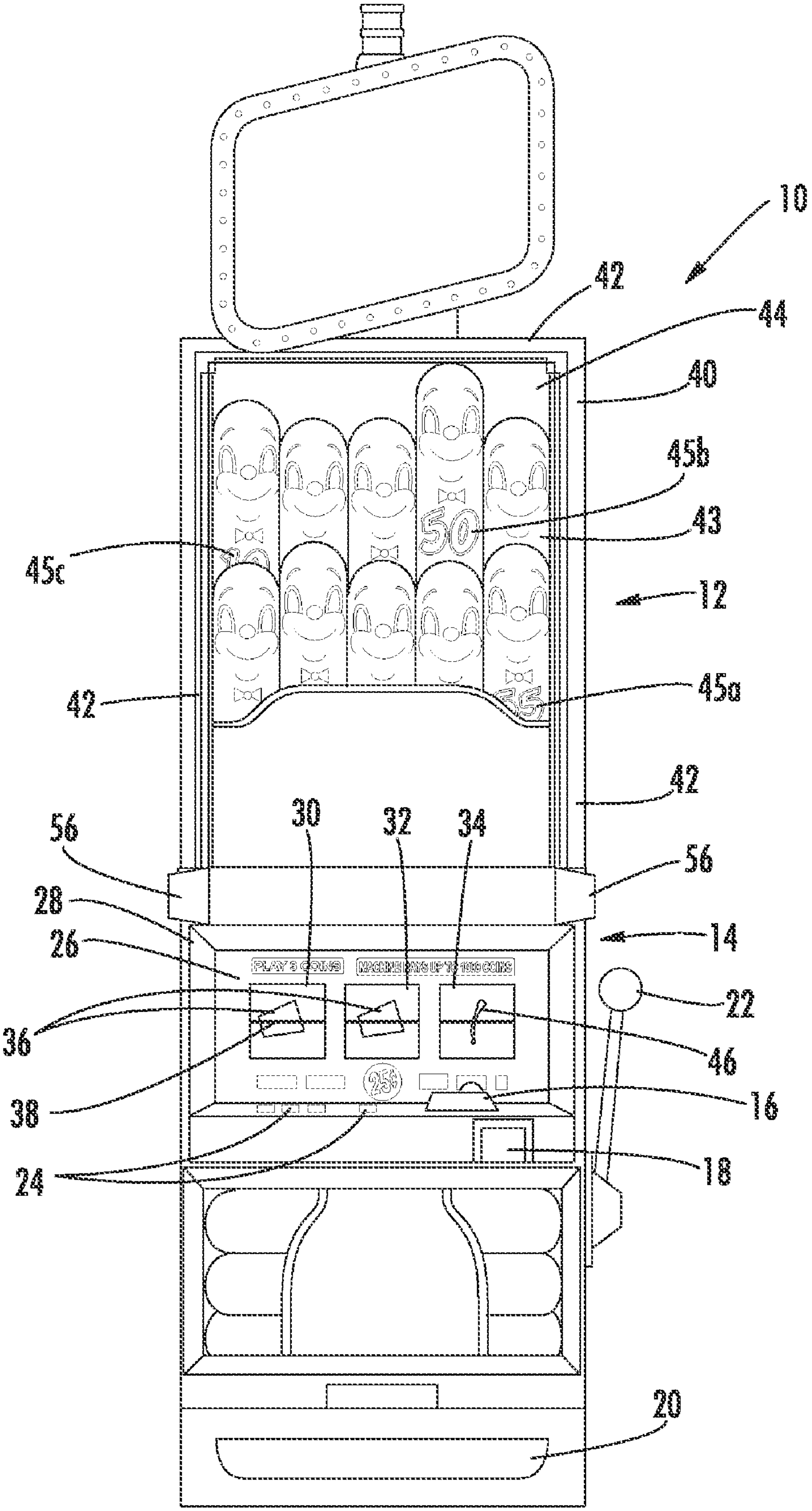
FIG. 1 is substantially a front elevational view of an embodiment of a gaming apparatus of the present invention.

As seen in FIG. 1, the present invention comprises a gaming apparatus, generally indicated by reference number 10. In at least one embodiment, gaming apparatus 10 comprises a display 12 and a gaming device 14. Gaming device 14 may be any of a large number of devices that are adapted to allow players to play a game, such as gaming devices typically found in arcade and casino environments, including arcade games, video games, gambling machines, video poker machines, slot machines, etc. In one embodiment, gaming device 14 allows a player to place a wager and play a game, such as a slot machine.

Gaming device 14 may include a value acceptor for accepting value from a player, such as a coin slot 16, card reader 18, or a voucher reader (not shown). In addition, a payout mechanism (not shown) and a coin receptacle 20 may be provided for awarding prizes or for dispensing value to players cashing out and retiring from a game. A printer (not shown) may also be provided for printing out cashless vouchers (not shown). A handle 22 and/or a button 24 may be provided for activating gaming device 14 to begin a game. A pay table (not shown) may further be provided to allow a player to see what symbol or combination of symbols provide one or more winning events. In at least one embodiment, gaming device 14 may be an S2000 model gaming device manufactured by International Game Technology in Reno, Nev.

Gaming device 14 may include a gaming outcome display 28 that may be positioned in front of the gaming device 14 so that a player (not shown) playing the gaming device 14 can see the gaming outcome display 28. Gaming outcome display 28 may utilize physical game reels 30, 32, and 34. Game reels 30, 32, and 34 may be attached to a drive mechanism (not shown) of gaming device 14 to rotate the reels in a manner well known in the art. Each game reel 30, 32, and 34 may have a plurality of symbols 36 positioned on the circumference of each game reel 30, 32, and 34. Game reels 30, 32, and 34 may be positioned side-by-side with coincident axes of rotation and a portion of their individual circumferences may face outward from gaming device 14.

A panel 26 may cover game reels 30, 32, and 34 such that only a portion of their individual circumferences are shown to the player. At least one symbol from any of game reels 30, 32, and 34 may be used to display a game outcome. At least one pay line 38 may be provided for the player to use in determining a game outcome based on the symbol or a combination of symbols positioned thereon. In an alternative embodiment, gaming outcome display 28 utilizes a video display (not shown) displaying images of game reels and an image of at least one pay line. A video display may also display game symbols in many other formats and arrangements, such as playing cards.

Gaming apparatus 10 may include a display 12 configured to display at least one game and prize to a player. Display 12 may be configured to display a bonus game and at least one bonus prize to the player. In other embodiments, display 12 may provide a primary game. Alternatively, display 12 may be a stand-alone device allowing a player to place a wager and play a game.

In at least one embodiment, display 12 is attached to gaming device 14 and positioned on top of gaming device 14. In other embodiments (not shown), display 12 may be separate from gaming device 14 but in communication with gaming device 14. In another embodiment, display 12 may be in communication with a plurality of different gaming devices 14 via a computer network in a manner that is well known in the art. Display 12 may also be positioned adjacent to or remote from gaming device 14. In other embodiments, display 12 is a stand-alone display not in communication with gaming device 14, and it may be capable of independently accepting value and wagers, conducting games, and awarding prizes to a player.

With continued reference to FIG. 1, display 12 may comprise a housing 40. Housing 40 may be square-shaped and may comprise a plurality of walls 42 defining an internal space or cavity 44. Of course, housing 40 may be made in many different shapes. Display 12 also has at least one display character 43 positioned within the housing 40. In at least one embodiment, display 12 has display characters 43, which may be three-dimensional and may be arranged in rows, each row having multiple display characters 43.

Display characters 43 may be configured to move vertically and may be located in housing 40 of display 12. Display characters 43 may be activated either by a controller 50 (FIG. 2) or a combination of an input device 24 and a controller 50. The number, arrangement, and dimensionality of display characters 43 may vary, and the directions of its movement may vary, including horizontal, zigzag, diagonal, or non-linear movements.

The appearance of display characters 43 may take on various forms and preferably are designed according to a theme of a game. Display characters 43 are not limited to any particular method of construction. In certain embodiments, display characters 43 may be three-dimensional figures. Display characters 43 may represent any suitable image or figure, including, but not limited to, human-like figures, animal figures, cartoon figures, figures of inanimate objects, and pointers.

In the example shown in FIG. 1, the theme of the game apparatus 10 is a gaming device 14 utilizing a plurality of animated hot dogs as display characters 43 that can move up and down within the housing 40, preferably in a choreographed manner. Accordingly, display characters 43 may take the shape of typical hot dogs, which may be at least partially cylindrical. Display characters 43 may be full or partial representations of hot dogs. Display characters 43 may move as if they are dancing up and down. Sounds from speakers 56 may be added so that the motion of display characters 43 may be made simultaneous or coincident with the music or the rhythm of the music. In at least one embodiment, a number of hot dogs 43 are provided as in a standard package of real hot dogs and may be arranged to appear as a pack of hot dogs.

In at least one embodiment, each display character 43 may comprise at least one indicium 45 affixed thereon. Alternatively, only some of display characters 43 have indicia 45. Indicia 45 may be affixed, imprinted, engraved, or represented on display character 43 in various positions and in any manner known in the art. Indicia 45 may be in various forms, such as a prize amount, a multiplier, a description of merchandise or a service, a progressive prize, or a jackpot prize. Indicium 45 may be used to indicate that a player has won a prize. If a display character 43 stops in a position so that indicium 45 is visible, the player may be awarded the prize indicated by the indicium 45 displayed on the character 43. In certain embodiments, indicium 45 is fully visible to the player when display character 43 is in its maximum moving range.

Figure 2:
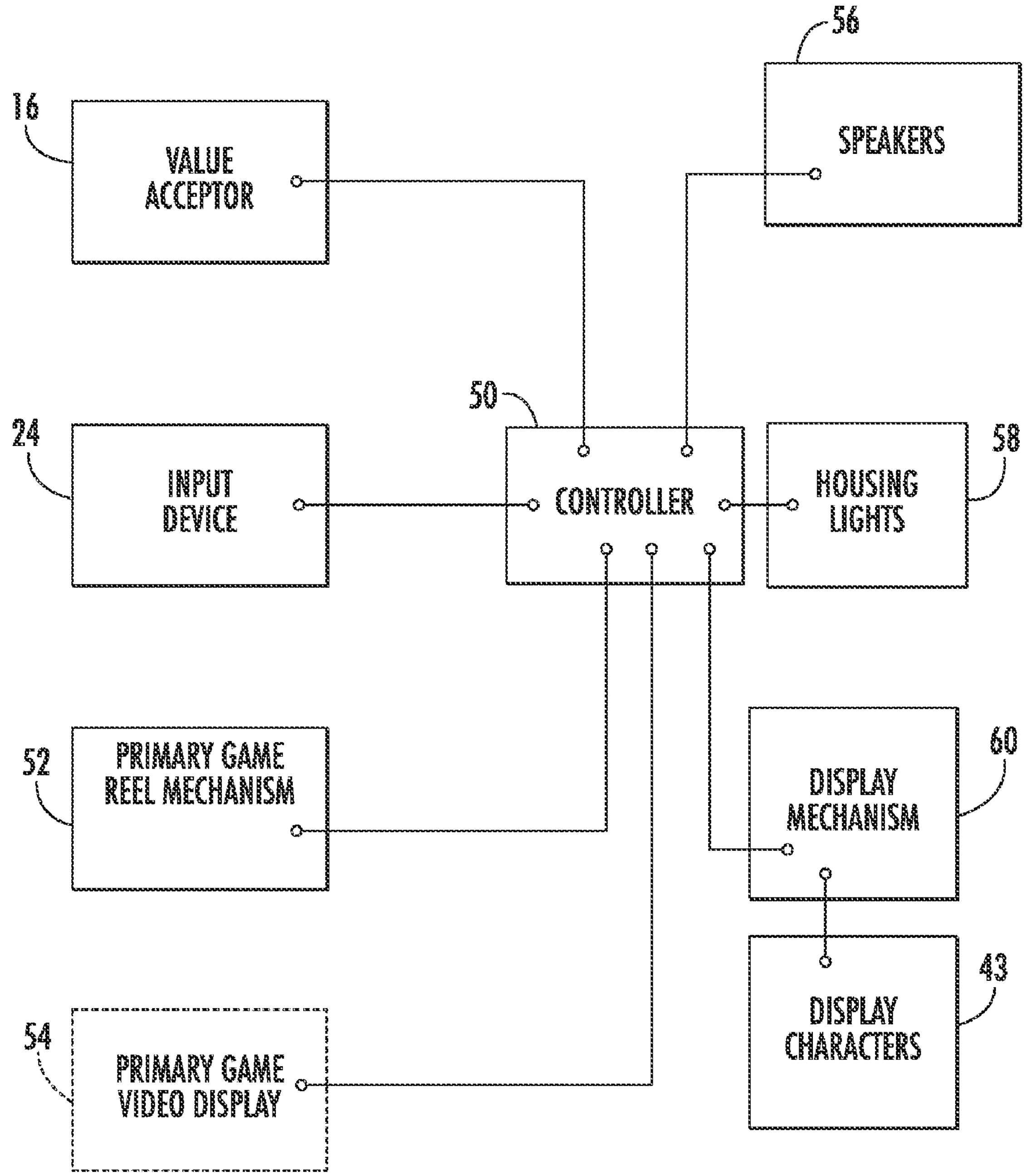
FIG. 2 is substantially a schematic diagram of the various components of an embodiment of the gaming apparatus.

Referring now to FIG. 2, a schematic diagram of the components included in at least one embodiment of gaming apparatus 10 is shown. Gaming apparatus 10 may include a value acceptor 16 configured to accept value from players in the form of paper currency, coins, player cards, vouchers, or other forms of value, value equivalents, and devices to store, record, or transmit value known in the art. Value acceptor 16 is preferably in communication with controller 50. Controller 50 may be in communication with an input device 24. Controller 50 may detect introduction of value into value acceptor 16 and may prompt players to start a game by activating input device 24. Once controller 50 senses a signal to start the game, controller 50 may be configured to produce a random number and activate reel mechanism 52 of a primary game such as gaming device 14.

Primary game reel mechanism 52 may be configured to display at least one indicium 45 (FIG. 1) on reels 30, 32, and 34 (FIG. 1) according to the random number generated by controller 50. Alternatively, controller 50 may be configured to produce a random number and activate the reels (not shown) of a video display 54 (shown in dashed lines) of a primary game such as gaming device 14. The reels of the primary game video display 54 may be configured to display indicia 45 in video form according to the random number generated by controller 50. The gaming device 14, whether in physical form or in video form, is not limited to reel-type games, but may include card games, dominoes, roulette, craps, baccarat, and other games known in the art.

As further shown in FIG. 2, gaming apparatus 10 (FIG. 1) may include speakers 56, housing lights 58, and display mechanism 60 in communication with controller 50. Controller 50 may be configured to store bonus event information and may be configured to detect bonus events. Upon an occurrence of a bonus event, controller 50 may activate speakers 56, housing lights 58, and display mechanism 60, which causes display characters 43 to move.

Speakers 56 may broadcast music to be heard by the player, and the music may be matched with choreographed movement of display characters 43. Housing lights 58 may be activated and may flash or blink, including in a manner that is synchronized with the music from speakers 56 and the movement of display characters 43. Housing lights 58 and speakers 56 together may create a festive and lively winning atmosphere to elicit interest and entertainment from both the player and adjacent patrons.

In at least one embodiment, when gaming apparatus 10 (FIG. 1) is not in use, display characters 43, housing lights 58, and display speakers 56 may be activated by controller 50 in an attract mode. Housing lights 58 may operate, blink, or flash, and display characters 43 may dance or move in a choreographed manner according to the music coming from speakers 56. In the attract mode it may be beneficial to ensure that display characters 43 do not display or indicate a prize in order to reduce the risk of players mistakenly believing they have been awarded a prize. In another embodiment, controller 50 may activate display mechanism 60 upon the occurrence of a bonus event.

Figure 3:
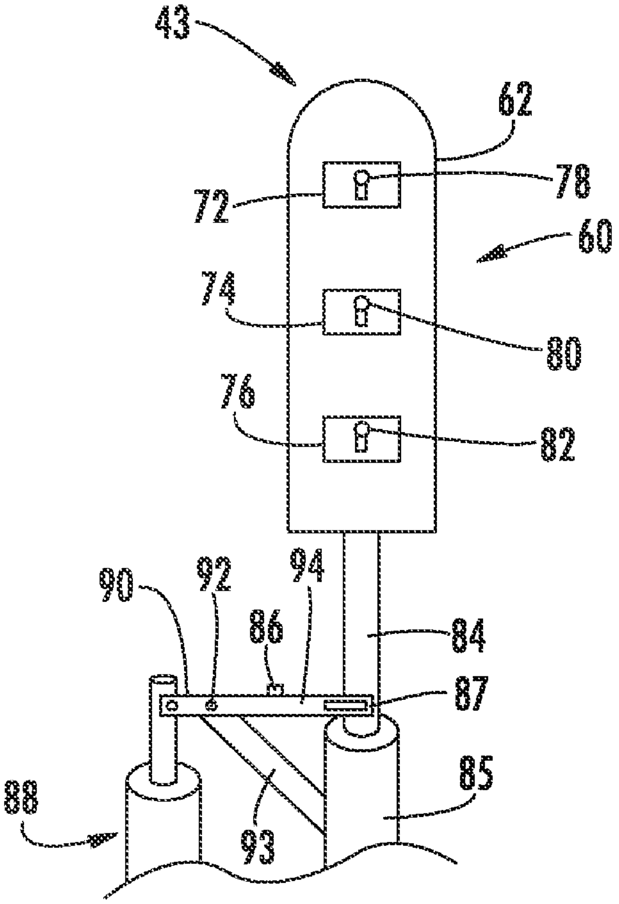
FIG. 3 is substantially a front perspective view of an embodiment of a display mechanism.

Referring now to FIG. 3, an embodiment of display mechanism 60 is shown. Display mechanism 60 may include at least one display character housing 62. In at least one embodiment, a plurality of display character housings 62 are provided. The number of display character housings 62 may vary depending on the number of display characters 43 desired. Display character housing 62 may define display character 43, and thus takes the desired appearance, shape, and form of display character 43 according to a theme of the game. Display character housing 62 may be made of molded plastic, steel, fiberglass, polymer, wood, metal, or other materials known in the art.

Each display character housing 62 may define one or more recesses, such as recesses 72, 74, and 76. Recesses 72, 74, and 76 may accommodate light sources 78, 80, and 82. Light sources 78, 80, and 82 may be incandescent, halogen, light-emitting diodes (LEDs), fluorescent, or other light sources known in the art. The number and positions of recesses 72, 74, 76 and light sources 78, 80, 82 may vary and still fall within the scope of the present invention.

Display character housing 62 may be covered by display material (not shown) that may be designed to look like a hot dog or other desired design and that may have an indicium 45 (FIG. 1). Light sources 78, 80, and 82 may be configured to transmit light on the indicium 45 to indicate a bonus prize to the player. The display material may be constructed of any suitable material, including metals, ceramics, foam materials, plastics, and wood. In certain embodiments, the display material is molded into a desired shape and slid over display character housing 62.

Display mechanism 60 may further include a shaft 84 coupled to the display character housing 62 and a guide 85. Shaft 84 may be moveable within guide 85. Shaft 84 may be coupled to an arm 86. Arm 86 may be connected to an actuator 88, which drives shaft 84, display character housing 62, and display character 43. Arm 86 may be moveably coupled to shaft 84, and arm 86 may define an opening 87 that allows arm 86 to move relative to shaft 84 when actuator 88 drives shaft 84.

Actuator 88 may be a solenoid that may cause arm 86 to move shaft 84, display character housing 62, and display character 43 vertically. Accordingly, arm 86 may comprise a lever 90, a fulcrum 92, and a resistance arm 94. A support strut 93 may be attached to fulcrum 92 to add actuating power to actuator 88. Actuator 88 may be various forms of electro-mechanical or mechanical motors known in the art as well as pneumatic or hydraulic actuators known in the art. Actuator 88, arm 86, and shaft 84 may be oriented in various orientations so as to cause display character housing 62 to move in various directions, such as horizontal, zigzag, or diagonal directions, and actuator 88 may be configured to operate at various speeds and power patterns, such as gradual-fast-gradual or incremental-full range-incremental. The ability of actuator 88 to be flexible in the way it moves display character housing 62 may be desirable, especially when display characters 43 are configured to move in a choreographed manner.

Figure 4:
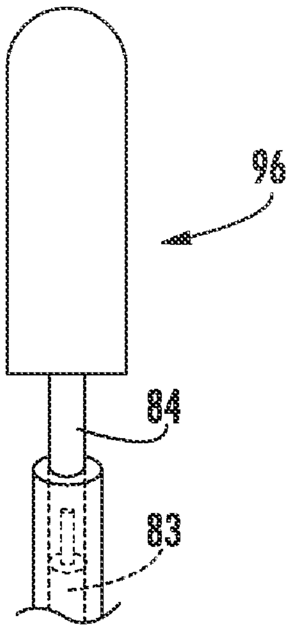
FIG. 4 is substantially a front perspective view of another embodiment of a display mechanism.

Referring now to FIG. 4, another embodiment of a display mechanism 96 is shown, which is similar to display mechanism 60 (FIG. 3) except that arm 86 (FIG. 3) is eliminated and actuator 88 is directly coupled to shaft 84.

Figure 5:
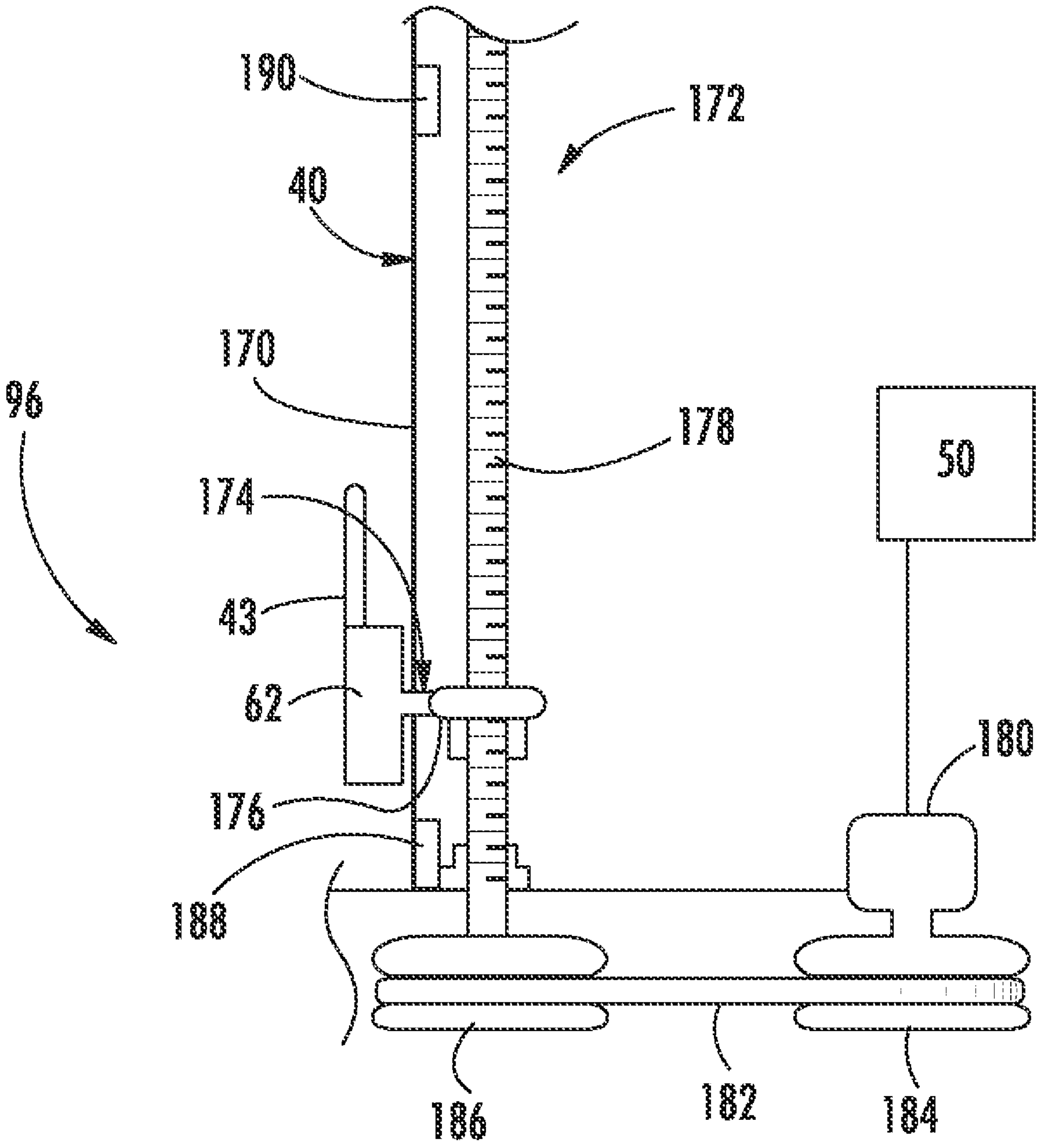
FIG. 5 is substantially a partial cross-sectional view of another embodiment of a display mechanism positioned substantially within a cut-away housing.

Referring now to FIG. 5, another embodiment 96 of display mechanism 60 is shown wherein display character housing 62 is coupled to a positioning mechanism 172 by a bracket 174. Positioning mechanism 172 may be positioned within the confines of housing 40. A slot 176 in the front wall 170 of housing 40 may be provided, which allows bracket 174 to pass through the front wall. Positioning mechanism 172 may comprise a worm gear 178 rotatable by a motor 180. Motor 180 may be attached to a first wheel 184. Worm gear 178 may be attached to a second wheel 186. A drive belt 182 may rotate around the first wheel 184 and the second wheel 186, thereby connecting the motor 180 and the worm gear 178. Positioning mechanism 172 may communicate with controller 50, which preferably stores information regarding pre-determined positions of display character 43 and display character housing 62. Sensors 188 and 190 may be in communication with controller 50 and may be provided to allow controller 50 to detect the position of the display characters 43. Other devices may be used to detect the position of the display characters 43, such as optical readers and the like.

Figure 6:
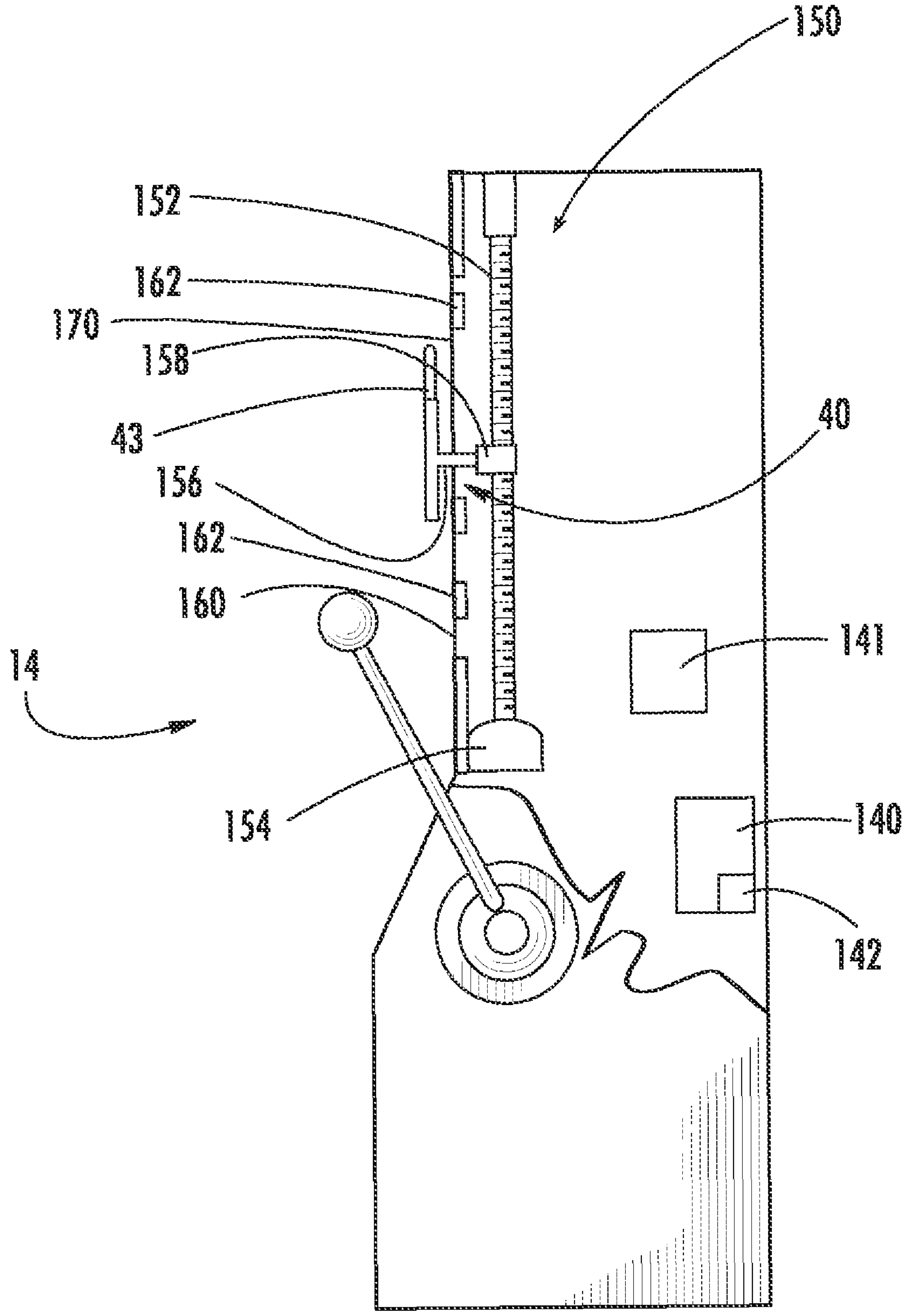
FIG. 6 is substantially a partial cross-sectional view of another embodiment of a display mechanism positioned substantially within a partially cut-away housing.

Referring now to FIG. 6, another embodiment 150 of a display mechanism 60 is shown. Display mechanism 150 may include a vertically positioned worm gear 152 that is caused to rotate by a motor 154. Display character 43 (FIG. 1) and display character housing 62 may be attached to worm gear 152 by a bracket 156 that is attached to a nut 158 threaded on worm gear 152. A slot 160 may be provided in the front wall 170 of housing 40, which allows bracket 156 to pass through the wall. A positioning mechanism 172 that includes sensors 162 may be provided to allow controller 140, or other control mechanism (not shown), to detect the position of the display character 43. While display character 43 was shown to move vertically, it may also be moved horizontally, or diagonally or in a non-linear fashion, such as in rotating manner or zigzag manner.

In another embodiment, a wheel (not shown) may be attached to motor 154. The periphery of the wheel may have at least one notch detectable by a sensor (not shown) and used by the bonus game controller 141 or game controller 140 to monitor the position of display characters 43. The wheel and worm gear 152 may be rotated together by motor 154. The sensor may monitor the position of display character 43 by detecting the notch. Bonus game controller 141 or game controller 140 may further store information pertaining to a predetermined number of times the sensor has detected the notch and the corresponding position of display character 43. An optical interrupt (not shown) may be provided to reset the display character position information. The sensor may be an infrared source and detector. In alternative embodiments, the periphery of the wheel may comprise portions with different reflective characteristics, such as absorbent paint lines, instead of the notch of the wheel. Motors 180 (FIG. 5) and 154 may be stepper motors, d.c. motors, servo motors, solenoids, actuators, or other motors.

Figure 7:
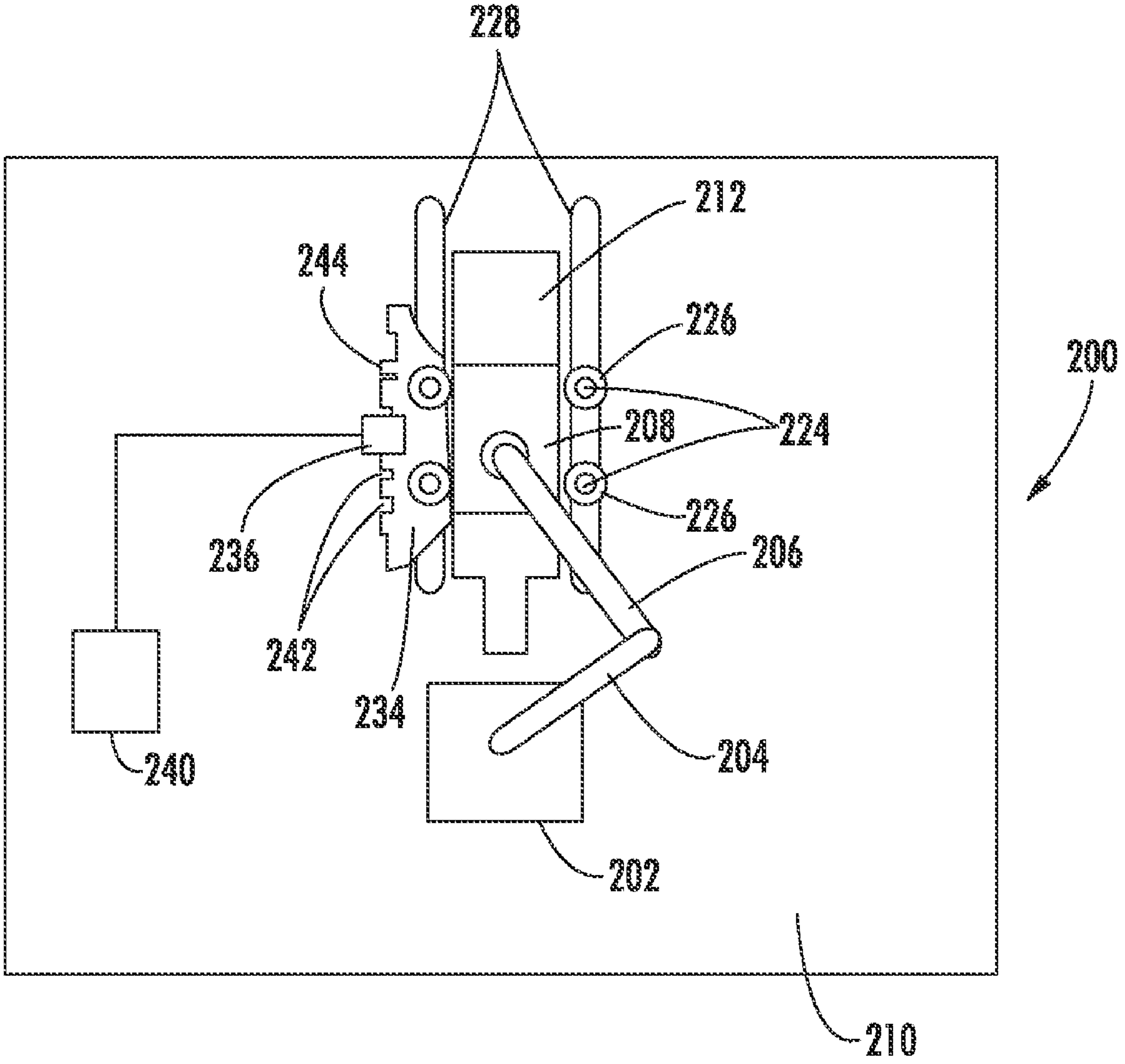
FIG. 7 is substantially a rear perspective view of another embodiment of a display mechanism.

FIG. 7 shows yet another possible embodiment 200 of display mechanism 60 for display characters 43 wherein an actuator 202 is coupled to a crank 204. Actuator 202 may be a motor, such as a stepper motor, a servo motor, a gear motor, a d.c. motor, or the like. One suitable motor is a brushless d.c. motor, model GM8724S020, available from Pittman, Inc. of Harleysville, Pa.

Crank 204 may be rotatably connected to link 206. Link 206 may be connected to carriage 208. As actuator 202 rotates, crank 204 causes link 206 to move up and down. Because link 206 is connected to carriage 208, carriage 208 will also move up and down when actuator 202 is operational.

Carriage 208 is secured behind an opening 212 in front wall 210 of housing 40 (FIG. 1). Carriage 208 may be secured by fasteners 224, which may include spacers 226, such as bushings, to allow carriage 208 to travel up and down as carriage 208 is actuated by actuator 202. Fasteners 224 may pass through slots 228.

As shown in FIG. 7, display mechanism 200 may also include a positioning mechanism 172 for detecting whether animated character 43 (FIG. 1) is in an up or down position. Any suitable positioning mechanism can be used. In one embodiment, positioning mechanism 172 may include an optical sensor 236 in communication with a controller 240. Optical sensor 236 may be model HOA 1887-12 available from Honeywell, Inc. of El Paso, Tex. In addition, an encoder 234 may be secured to carriage 208, such as by fasteners 224 and spacers 226.

Encoder 234 may have a series of cutout sections 242. As carriage 208 moves, encoder 234 will move past sensor 236. In turn, cutouts 242 will be read by optical sensor 236. Sensor 236 may communicate this interruption to controller 240, which then knows the position of display character 43. A larger cutout section 244 may be included to communicate to controller 240 when carriage 208 is all the way up or all the way down.

Of course, other actuating mechanisms and/or detection systems may be used without departing from the scope of the present invention. For example, an indexing motor, such as a stepper motor, may be used to control the position of display character 43. In other embodiments, a rack and pinion system could be used to move display character 43.

With reference back to FIG. 6, game controller 140 may utilize a random number generator 142 and may control gaming device 14. Random number generator 142 may produce a random or pseudo-random number for each game. The outcome of the game may be determined by the random number. For example, the game outcome may be determined by comparing the random number produced by random number generator 142 to a table of outcomes stored in a memory and accessed by game controller 140. A number of different tables of outcomes may be used and different tables may be used for different games. The tables can be designed so that different prizes have different probabilities of being awarded. Such design techniques are well known in gaming and are described above. Examples of such designs are shown in U.S. Pat. No. 4,448,419, issued to Telnaes, and U.S. Pat. No. 5,456,465, issued to Durham, which are hereby incorporated by reference. Game controller 140 may cause gaming outcome display 28 (FIG. 1, e.g., game reels 30, 32, and 34) to show the outcome of the game that corresponds to the random number generated by random number generator 142. Gaming device 14 may operate in many other ways and still achieve the objects of the present invention.

Gaming device 14 may also be capable, via game controller 140 or other control mechanism (not shown), of producing a bonus-activating event. This event may be many different types of events. For example, a bonus-activating event may comprise a game outcome such as displaying a particular symbol, e.g., a "bonus" symbol 46 (FIG. 1), or combination of symbols, such as three "7" symbols on reels 30, 32, and 34. If the game being played is poker-based, the bonus-activating event may be an occurrence of a certain hand, such as a royal flush. Furthermore, a bonus-activating event may occur when a player accumulates a certain number of symbols or game outcomes over a certain number of separate game plays. For example, a bonus-activating event may occur when the player receives three "bonus" symbols during a pre-defined period of time. The bonus-activating event may be based on an external event. For example, a bonus-activating event may occur when a group of players obtain a certain result. Sensors may be provided external to gaming device 14 to detect external bonus-activating events.

A bonus game controller 141 may further be provided to detect when a bonus activating event occurs in gaming device 14. Game controller 140 may determine the outcome of each game, and when a bonus-activating outcome occurs, game controller 140 may transmit a signal to the bonus game controller 141. Alternatively, the bonus game controller 141 may periodically interrogate the game controller 140. The bonus game controller 141 and game controller 140 may be a single controller or separate controllers. One suitable controller is model GAM 2000, available from Eagle Engineering, Inc. of Pottstown, Pa.

The bonus prize may be determined by a random number generator (not shown) and a virtual pay table, such as the pay table described in U.S. Pat. No. 5,823,874 issued to Adams and hereby incorporated by reference. A simple pay table may also appear as follows:

TABLE 1

| Random Number | Amount Paid |
|---|---|
| 0.00 to 0.50 | $10.00 |
| 0.51 to 0.75 | $50.00 |
| 0.76 to 0.95 | ×2 |
| 0.96 to 1.00 | $10,000.00 |

For example, if the random number generator produced a result of 0.65, controller 50 (FIG. 2) may cause the display character 43 (FIG. 1) having an indicium 45 (FIG. 1) representing 50 coins (assuming each coin has a value of $ 1.00) to stop at the maximum movement range of display character 43, which is preferably at the top of prize display housing 40 or adjacent thereto. Alternatively, if the random number generator produced a result of 0.85, the controller may cause the display character 43 having an indicium representing a multiplier of 2 to stop at the maximum movement range of display character 43. Controller 50 may then cause a bonus meter to display "10×2=20," (assuming a base prize of 10) and $20.00 would be awarded to the player. If the actual bonus prize is money, the amount of the bonus prize may be added to the player's credit meter (not shown) or the bonus prize may be dispensed to coin receptacle 20 (FIG. 1).

The bonus selection process may be repeated for a predetermined number of times to accumulate several bonus prizes that are added to form the total prize awarded to the game player. For example, the bonus game could be repeated three times to accumulate an award. The present invention is not limited to the example pay table shown. Furthermore, different kinds of bonus prizes may be awarded, such as progressive prizes, jackpot prizes, merchandise, prize multipliers, and additional games. Other effects may also be presented, such as pre-recorded sound from speakers 56 (FIG. 1). Speakers 56 may further be configured to announce a prize a player has won, play music during a prize winning event, announce features of the game offered by gaming apparatus 10 (FIG. 1), or play music to attract and entertain patrons. Additionally, a variety of graphics and lights preferably designed according to a particular theme are displayed on display 12 (FIG. 1).

Figure 8:
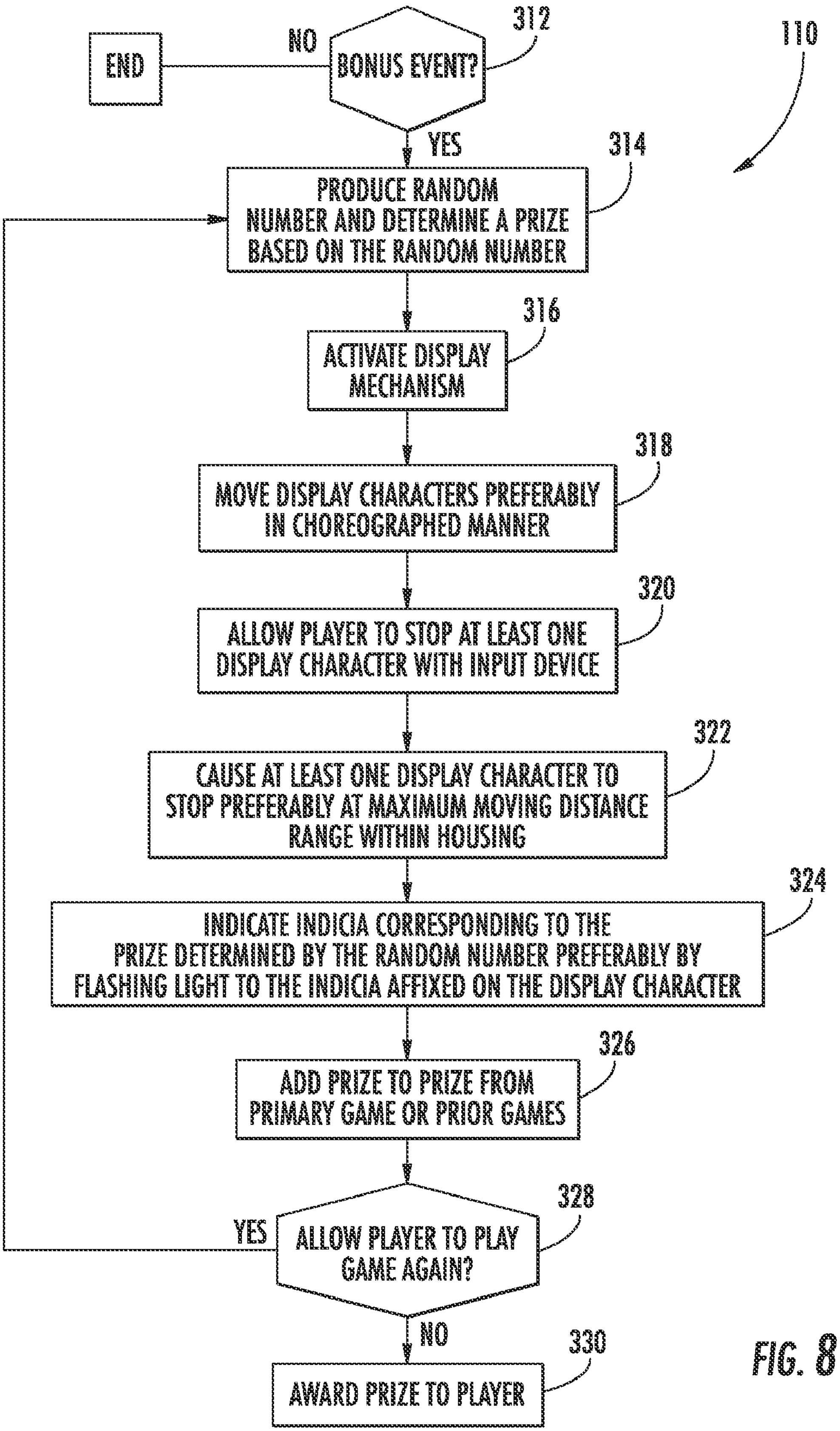
FIG. 8 is substantially a flowchart of a gaming method according to the present invention.

Referring now to FIG. 8, a gaming method 310 is shown wherein controller 50 (FIG. 2) determines whether a bonus event has occurred in step 312. If a bonus event has occurred, the controller 50 produces a random number and determines a prize based on the random number at step 314. At step 316, the controller 50 may activate display mechanism 60 (FIG. 3) to start the movement of display characters 43 (FIG. 1). At step 318, display characters 43 may move in choreographed manner, such as performing a dance. Optionally, at step 320, the controller 50 may prompt a player to stop a display character 43 by activating an input device 24 (FIG. 1), such as by pressing a touch pad or a button. At step 322, the controller 50 may cause at least one display character 43 to stop, which in certain embodiments may be at the maximum moving distance range within housing 40 (FIG. 1).

In at least one embodiment, the player is allowed to participate in stopping at least one display character 43, and the controller 50 is configured to stop the display character 43 at a pre-defined position. The preferred embodiment provides the player a feeling of control over the positioning of the display character 43. Of course, regulatory issues may require that this feeling of control be illusionary. At step 324, the controller 50 causes display mechanism 60 to indicate an indicium 45 (FIG. 1) corresponding to the prize determined by the random number preferably by activating a light source 78 (FIG. 3) inside display character housing 62 (FIG. 3) to illuminate the indicium 45 affixed to the stopped display character 43. At step 326, the prize may be added to any prizes from previous games. At step 328, the controller 50 determines whether the player is entitled to play another game. For example, the player may have been awarded a certain number of rounds to play the bonus game. If yes, then steps 314 to 328 are repeated. It is noted that steps 314 to 328 may be repeated a pre-determined number of times and the sum of the prize values may be displayed. At step 330, the total prize may be awarded to the player. Lights and sounds may be generated to create a festive prize event atmosphere. It is noted that the flowchart in FIG. 7 only shows one possible embodiment. Some of the steps in the flowchart may be varied, changed in order, or eliminated and still fall within the scope of the present invention.

Alternative Embodiments

Figure 9:
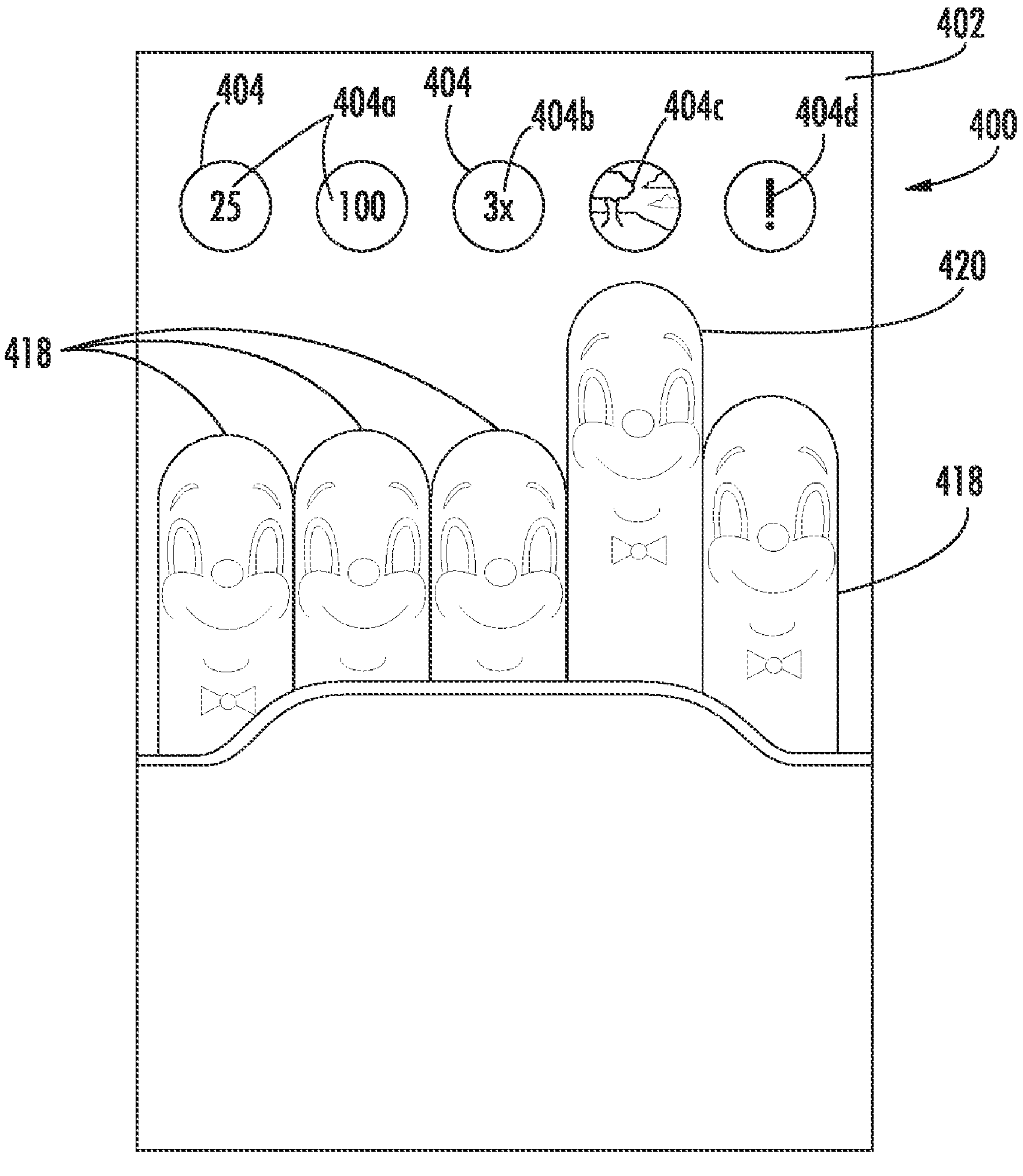
FIG. 9 is substantially a front elevational view of an embodiment of a gaming display of the present invention.

The present invention may be practiced in a number of alternative embodiments. For example, as illustrated in FIG. 9, an embodiment 400 of the present invention may include a plurality of prize displays 404. Prize displays 404 may present a variety of indicia, including prize amounts 404*a*, multipliers 404*b*, goods or services 404*c* (illustrated as a symbol representing a vacation), or other awards 404*d* such as progressive prizes or jackpot prizes.

Prize displays 404 may be fixed, such as being painted on display 402 or illuminated representations. Alternatively, prize displays 404 may be changeable and include LED meters, LED screens, LCD displays or the like. If prize displays 404 are changeable, they may provide an extra element of player suspense and may provide an opportunity for the player to interact with the gaming apparatus 10 (FIG. 1).

For example, if prize displays 404 are changeable, the indicia appearing on prize displays 404 may change during the time display characters 418 are in motion. The prize displays 404 may be choreographed to music or sounds in a similar manner to display characters 418. The suspense created by the game may be greater because players may be anticipating both what display character 418 will indicate their prize, and what prize will be indicated by the prize display 404.

In other embodiments, the player can be given control over either the prize displays 404 or the movement of display characters 418. For example, the player may be able to stop the movement of the display characters 418 by activating an input device 24 (FIG. 1). The player may be able to choose which display characters 418 will indicate a prize. Alternatively, the player input device 24 may cause display characters 418 to stop moving in such a way that the player does not control the exact positions of display characters 418. For example, the display characters may come to a gradual stop after the player activates input device 24.

If the player is able to choose the exact position of display characters 418, a controller 50 (FIG. 2) may cause the prize display 404 indicated by the selected display character 420 to display at least one indicium 404*c* corresponding to the game outcome. If the player cannot chose the exact position of the display characters 418, the controller 50 may direct the movement of the display character 418 and/or prize displays 404 such that the final display presented to the player has a display character 418 indicating a prize display 404 displaying at least one indicium corresponding to the game outcome.

Figure 10:
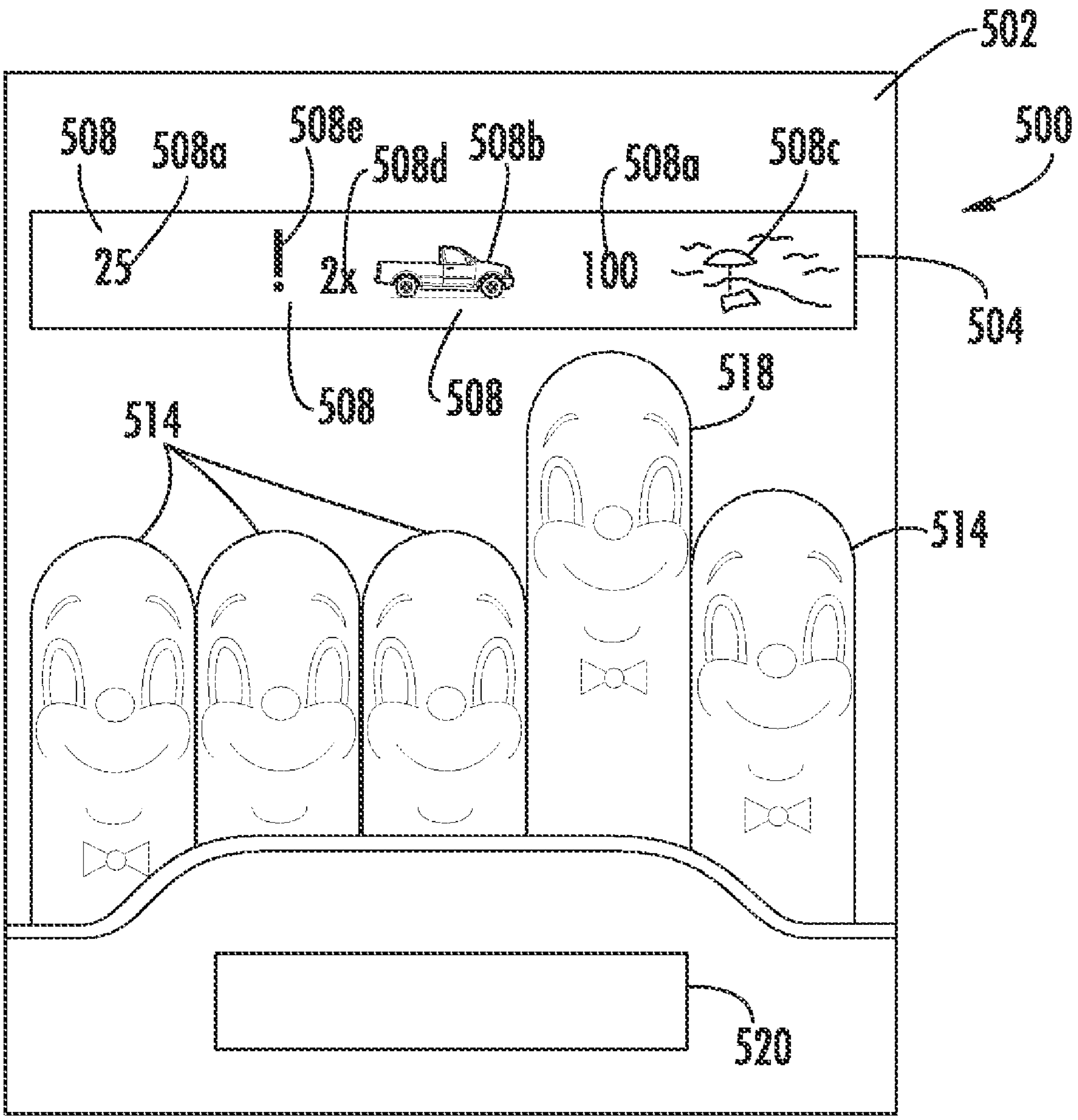
FIG. 10 is substantially a front elevational view of another embodiment of a gaming display of the present invention.

FIG. 10 an embodiment somewhat similar to that of FIG. 9. As shown in FIG. 10, individual prize displays 404 have been replaced by a changeable display area 504. Changeable display area 504 may be any number of display devices, including, without limitation, LED screens, LED meters, LCD displays, CRT tubes, plasma displays, scrollable flexible bands of material, and the like. Display area 504 may be used to display static or moving indicia 508. As in previously described embodiments, indicia 508 may represent game related values such as prize amounts 508*a*, a good 508*b* (such as a car), a service 508*c* (such as a vacation), a multiplier 508*d*, and other special awards 508*e* (such as jackpot prizes or progressive prizes). The method of operation of display 500 may be similar to previously described embodiments, such as having fixed prize indicia, changeable prize indicia, and player input that may affect the movement of display characters 514 and/or indicia 508.

In certain embodiments, an additional display area 520 may be included. Additional display area 520 may display other information that is relevant to the game or prizes. For example, display area 520 may display the value of a progressive jackpot or it may present instruction to the player on how to play the game.

Figure 11:
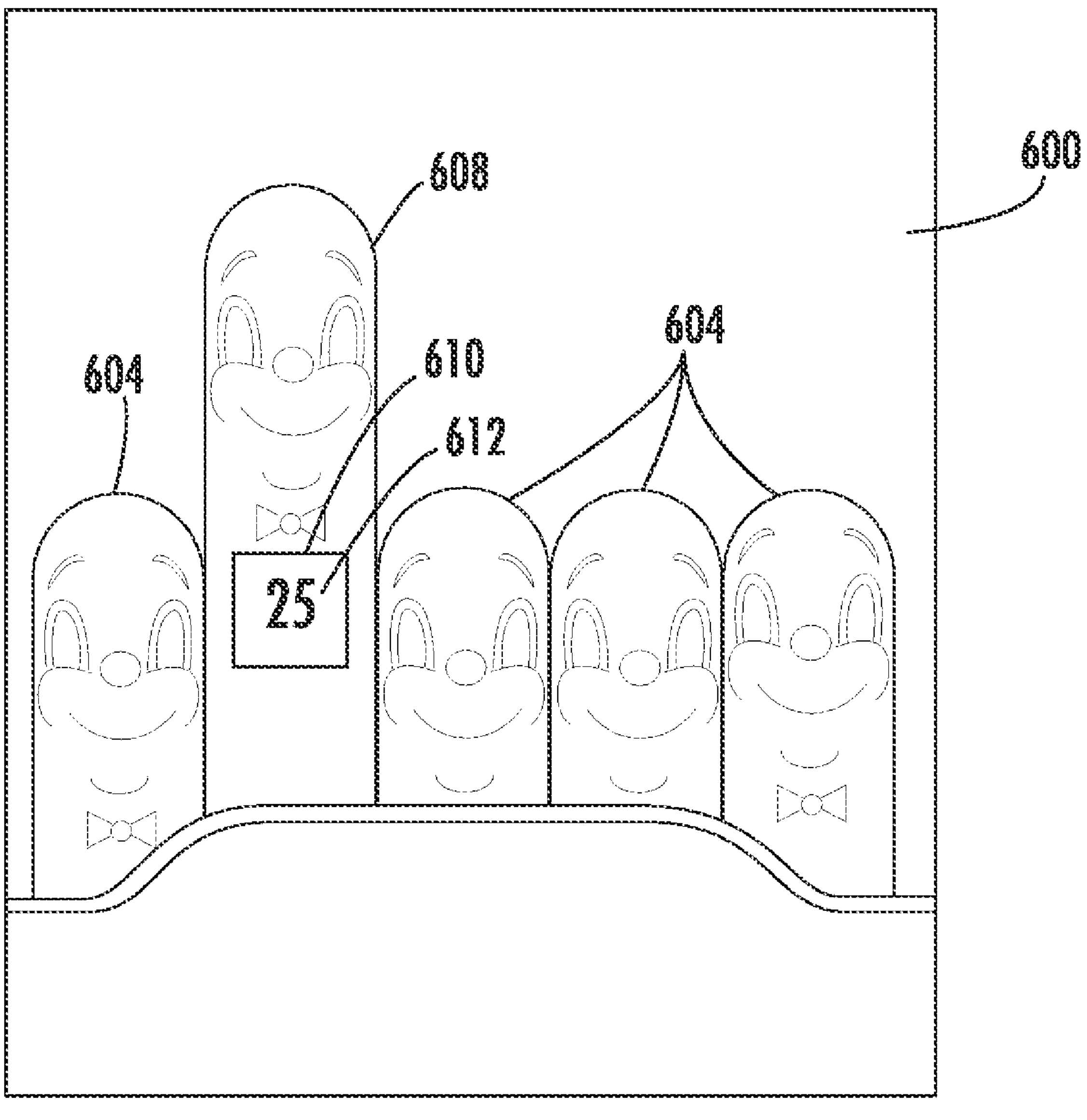
FIG. 11 is substantially a front elevational view of another embodiment of a gaming display of the present invention.

FIG. 11 illustrates another embodiment of the present invention. FIG. 11 illustrates a number of display characters 604. One or more of display characters 604 may have a prize display 610. Prize display 610 may be any suitable display, including LED meters, LED screens, LCD screens, plasma displays, and the like. Prize display 610 may display one or more indicia 612. The indicia 612 may be game-related indicia as previously described.

In operation, the indicia 612 on prize display 610 may change as the display characters 604 move, or it may be fixed. If the indicia 612 change, the changing indicia 612 may be choreographed in a manner similar to any choreography for display characters 604. If the indicia change, players may be allowed to choose a display character 604 to indicate a prize. The controller can then select appropriate indicia 612 to display on the selected display character 608 to correctly indicate the game outcome. Operation may be similar to previously described embodiments, including the availability of cumulative prizes, prizes and multiplies, and so forth. In at least one embodiment prize display 610 is only visible on display character 608 in an indicating position (such as hot dog 608 shown in an extended position in FIG. 11).

Figure 12:
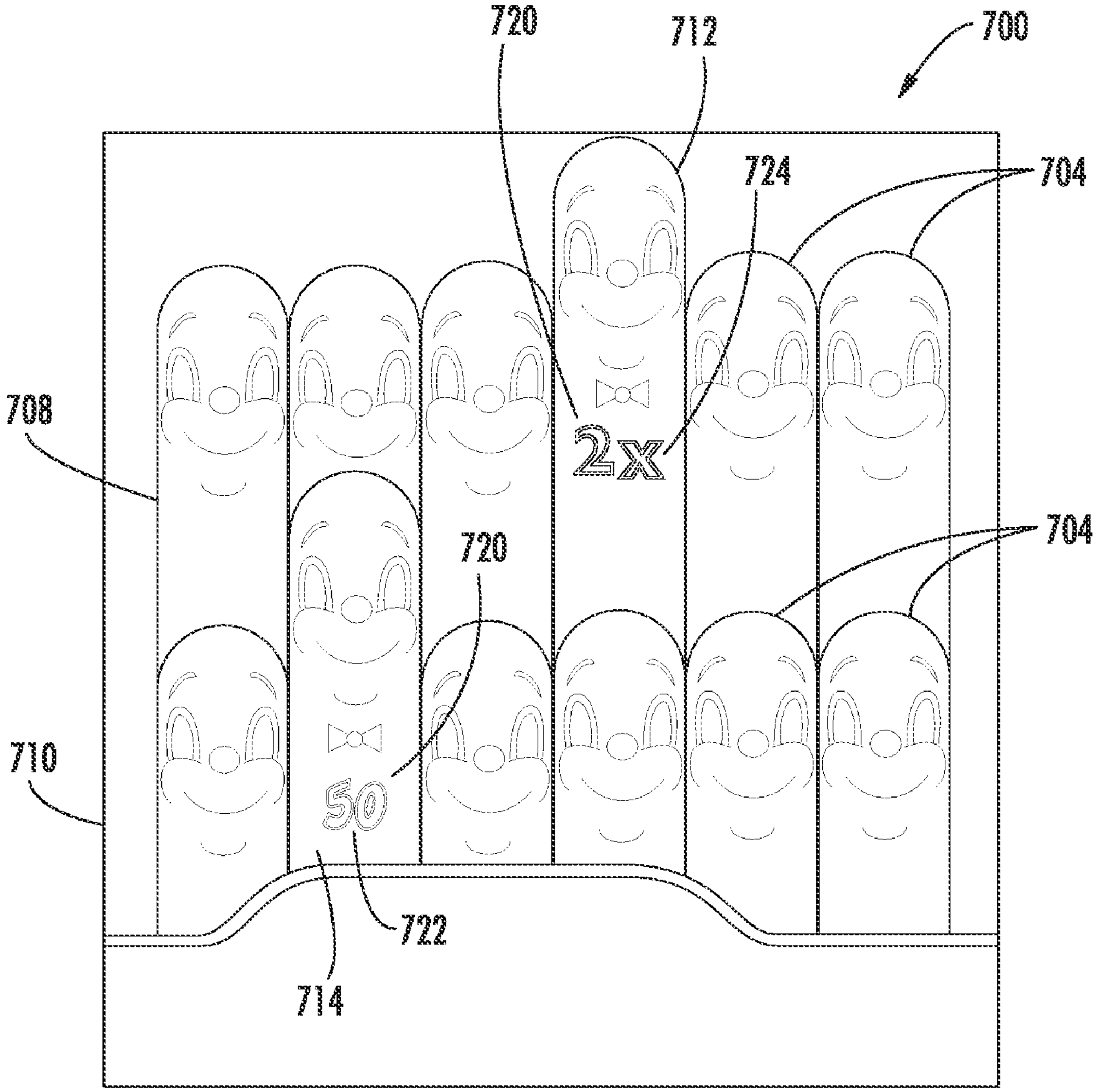
FIG. 12 is substantially a front elevational view of another embodiment of a gaming display of the present invention.

In certain embodiments, more than one display character 608 can be used to indicate indicia 612. For example, FIG. 12 shows a display 700 having a plurality of display characters 704. Display characters 704 are shown arranged in two rows 708 and 710. In one embodiment, a player may be awarded a prize that is a combination of indicia 720 from first row 708 and second row 710. For example, one display character 714 may display a prize value 722. Another display character 712 may display a multiplier value 724. The total prize awarded to the player may be the product of the prize and the multiplier. Row 708 may consist of all one type of indicia, such as a multiplier, while row 710 consists of another type of indicia, such as prize amounts. Alternatively, row 708 and row 710 may contain different types of indicia, with a controller (not shown) capable of selecting appropriate display figures 704 from each row 708, 710 to correctly indicate the game outcome. Additional indicia, such as indicia representing a jackpot prize could be included in one or more rows 708, 710.

Figure 13:
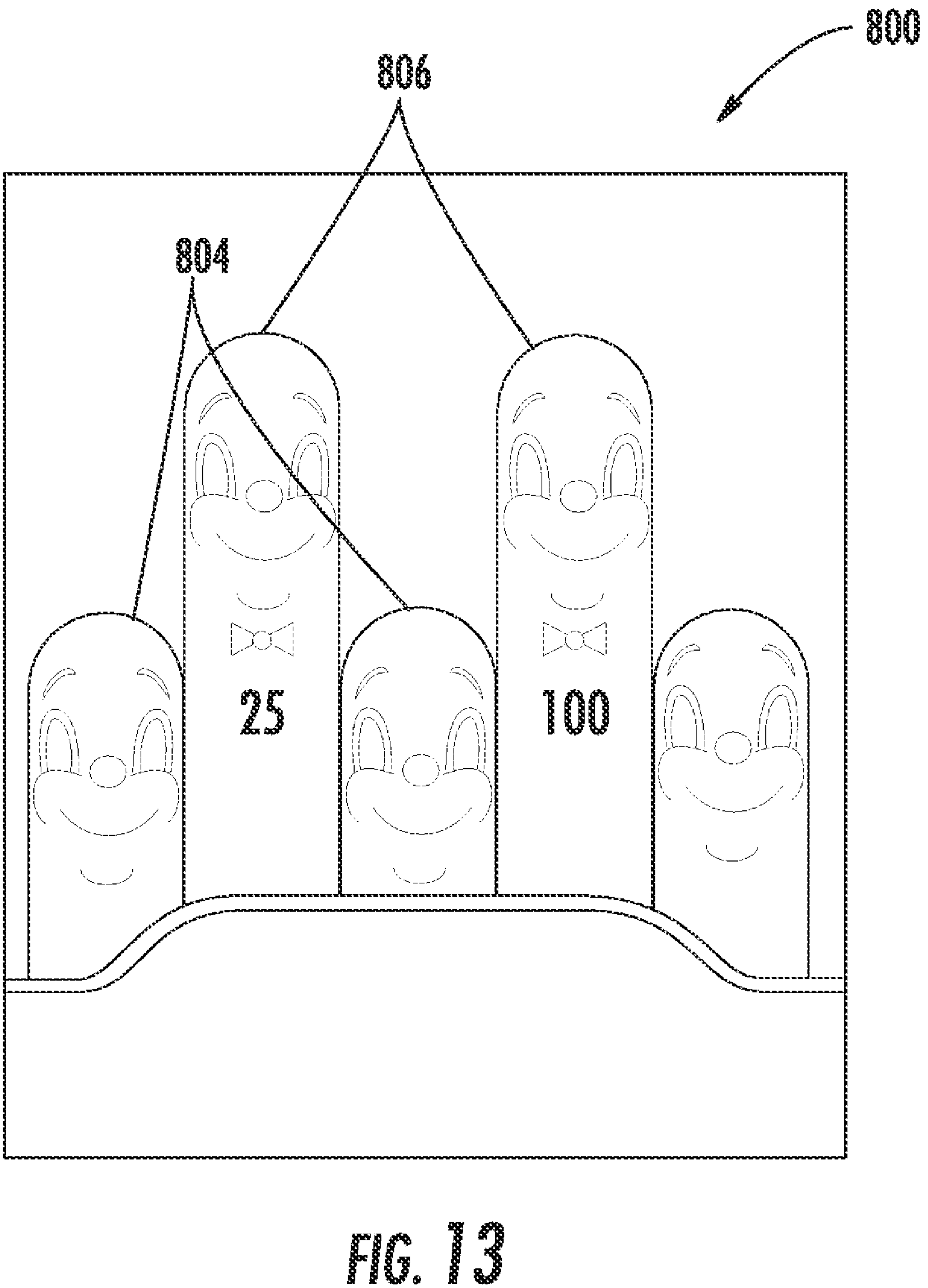
FIG. 13 is substantially a front elevational view of another embodiment of a gaming display of the present invention.

FIG. 13 illustrates another embodiment of the present invention where multiple display characters 804 may be used to indicate prizes. FIG. 13 illustrates a display 800 having a plurality of display characters 804. Two display characters 806 are in an extended position whereby they indicate prizes. The player may be awarded the sum (or any other mathematical combination) of the prizes appearing on display characters 806. Of course, any number of display characters 804 can be used, and any number of display characters 806 may be used to indicate a cumulative prize awarded to a player.

Conclusion

It can thus be realized that certain embodiments of the present invention may provide a highly attractive and entertaining device for conducting games and for displaying prizes. Certain embodiments of the present invention may have the ability to attract more patrons to play a game and the ability to encourage players to play longer on a gaming apparatus. Certain embodiments may provide at least one attractive prize display. Certain embodiments may utilize intermediate steps between the occurrence of the bonus event and the awarding of the bonus prize. Certain embodiments may provide intermediate steps between the occurrence of the bonus event and the awarding of the bonus prize that involve player participation. Certain embodiments may provide intermediate steps between the occurrence of the bonus event and the awarding of the bonus prize that involve an eye-catching display. Certain embodiments may further provide an additional element of anticipation and excitement for players.

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than solely by the examples given.

We claim:

1. A gaming method comprising, but not necessarily all in order shown:

(A) allowing a player to place a wager on a gaming device comprising a plurality of display characters and at least one indicium, the plurality of display characters being configured to move independently between an indicium indicating position and a non-indicating position;

(B) presenting a game to the player on the gaming device;

(C) randomly determining a game outcome in a game controller;

(D) moving a plurality of the display characters independently between their respective indicium indicating position and non-indicating position under the control of the game controller;

(E) selecting, using the game controller, at least a first indicium of the at least one indicium corresponding to at least part of the random game outcome; and (F) stopping the movement of the plurality of display characters such that one or more of the display characters indicate the at least a first indicium.

2. The method of claim 1 further comprising providing the first display character as a three-dimensional character.

3. The method of claim 1 further comprising:

(A) allowing the player to provide input via a player input device; and (B) moving at least one of the plurality of display characters in accordance with the player input.

4. The method of claim 1 further comprising moving at least one of the plurality of display characters in a choreographed manner.

5. The method of claim 1 wherein the at least one indicium further comprises a plurality of indicia and the gaming device comprises a changeable display area on which the plurality of indicia may be displayed, further comprising:

(A) displaying the plurality of indicia on the changeable display area;

(B) moving the plurality of indicia on the changeable display area; and (C) stopping the plurality of indicia such that the first indicium corresponding to at least part of the game outcome is indicated by at least one of the plurality of display characters.

6. The method of claim 1 wherein the first indicium indicated by the first display character represents a prize, further comprising awarding the prize to the player.

7. The method of claim 1 further comprising:

(A) moving a second display character of the plurality of display characters;

(B) displaying a second indicium of the at least one indicium corresponding to at least part of the random game outcome; and (C) positioning the second display character to indicate the second indicium.

8. The method of claim 7 wherein the first indicium represents a prize amount, the second indicium represents a multiplier, further comprising multiplying the prize amount by the multiplier to obtain a total prize.

9. The method of claim 7 wherein the step of moving the first display character further comprises moving the first display character from a first position to a second position, wherein the first indicium is hidden from the player when the first display character is in the first position and the first indicium is viewable by the player when the first display character is in the second position.

10. The method of claim 1 further comprising determining the position of the first display character.

11. A gaming method comprising, but not necessarily all in order shown:

(A) step for placement of a wager on a gaming device by a player, wherein the gaming device comprises a plurality of display characters and at least one indicium, the plurality of display characters being configured to move independently between an indicium indicating position and a non-indicating position;

(B) step for presentation of a game to the player;

(C) step for determination of random game outcome in a game controller;

(D) step for movement of a plurality of the display characters independently between their respective indicium indicating position and non-indicating position under the control of the game controller;

(E) step for selecting, using the game controller, of at least a first indicium of the at least one indicium, wherein the first indicium corresponds to at least part of the random game outcome; and (F) step for stopping the movement of the plurality of display characters such that one or more of the display characters indicates the at least a first indicium.

12. The method of claim 11 further comprising:

(A) step for input to the game by the player; and (B) step for movement of at least one of the display characters in accordance with input to the game by the player.

13. The method of claim 11 further comprising:

(A) step for display of a plurality of indicia on a changeable display area of the gaming device;

(B) step for movement of the plurality of indicia on the changeable display area; and (C) step for indication of the first indicium of the plurality of indicia by at least one of the plurality of display characters.

14. The method of claim 11 further comprising:

(A) step for movement of a second display character of the plurality of display characters;

(B) step for display of a second indicium of the at least one indicium corresponding to at least part of the random game outcome; and (C) step for indication of the second indicium by the second display character.

15. The method of claim 14 further comprising a step for obtainment of a total prize by multiplication of a prize amount represented by the first indicium and a multiplier represented by the second indicium.

* * * * *